(12) United States Patent
Hamedani

(10) Patent No.: US 9,024,763 B2
(45) Date of Patent: May 5, 2015

(54) ARRANGEMENT COMPRISING AN OBJECT MADE AT LEAST PARTIALLY OF METAL OR PRECIOUS METAL AND AN RFID IDENTIFICATION DEVICE

(76) Inventor: Soheil Hamedani, Grafing (DE)

( * ) Notice: Subject to any disclaimer, the term of this patent is extended or adjusted under 35 U.S.C. 154(b) by 807 days.

(21) Appl. No.: 12/224,390

(22) PCT Filed: Feb. 3, 2007

(86) PCT No.: PCT/DE2007/000199
§ 371 (c)(1),
(2), (4) Date: Aug. 26, 2008

(87) PCT Pub. No.: WO2007/098728
PCT Pub. Date: Sep. 7, 2007

(65) Prior Publication Data
US 2009/0015431 A1 Jan. 15, 2009

(30) Foreign Application Priority Data
Mar. 3, 2006 (DE) .................... 20 2006 003 555 U
May 30, 2006 (DE) .......................... 10 2006 025 000

(51) Int. Cl.
G08B 13/14 (2006.01)
G06K 19/077 (2006.01)
G06K 19/02 (2006.01)

(52) U.S. Cl.
CPC .......... *G06K 19/07771* (2013.01); *G06K 19/02* (2013.01); *G06K 19/07749* (2013.01)

(58) Field of Classification Search
CPC .......... G06K 7/0008; G06K 19/07749; G06K 19/07758; H01Q 1/2225; G08B 13/2434

USPC ......... 340/825.49, 572.1, 572.6, 572.7, 572.8
See application file for complete search history.

(56) References Cited

U.S. PATENT DOCUMENTS 5,566,441 A * 10/1996 Marsh et al. .................... 29/600
5,598,840 A    2/1997 Iund et al.
(Continued)

FOREIGN PATENT DOCUMENTS

DE         4102435 A1 *  8/1992
DE         44 25 736       1/1996
(Continued)

*Primary Examiner* — George Bugg
*Assistant Examiner* — Anthony D Afrifa-Kyei
(74) *Attorney, Agent, or Firm* — Welsh Flaxman & Gitler LLC

(57) ABSTRACT

The invention relates to an arrangement including an object made at least partially of metal and/or precious metal and an RFID system, wherein the object and the RFID system are connected to one another in such a way that the transponder and the aerial of the RFID system are applied on a site of the object, on its surface, which is facing or can be caused to face an assigned reading device or are embedded into its surface in the form of an inlay, and means are provided which shield or attenuate the electrically conductive surface of the object against eddy currents induced in the conductor loop. Furthermore, the invention relates to a method for tracking and position-fixing objects of all kinds, which are made at least partially of metal and/or precious metal or are plated therewith, and into which a position-fixing device operating according to RFID technology is integrated. A transponder and, spaced apart from the latter, an aerial coupled with a reading device are disposed in or on the object at an application-specific conductive site and the transponder is shielded with respect to the conductive surface.

12 Claims, 2 Drawing Sheets

(56) References Cited

U.S. PATENT DOCUMENTS

| | | | | |
|---|---|---|---|---|
| 5,698,840 A * | 12/1997 | Jurisch et al. | | 235/493 |
| 6,107,920 A * | 8/2000 | Eberhardt et al. | | 340/572.7 |
| 6,271,801 B2 | 8/2001 | Tuttle et al. | | |
| 6,310,778 B1 * | 10/2001 | Finn et al. | | 361/737 |
| 6,486,780 B1 | 11/2002 | Garber et al. | | |
| 6,812,838 B1 * | 11/2004 | Maloney | | 340/568.1 |
| 7,053,854 B2 * | 5/2006 | Plettner et al. | | 343/841 |
| 7,205,899 B2 * | 4/2007 | Surkau | | 340/572.8 |
| 7,843,347 B2 * | 11/2010 | Nikitin et al. | | 340/572.7 |
| 2004/0231546 A1 * | 11/2004 | Ofca | | 102/202.8 |
| 2005/0104796 A1 | 5/2005 | Plettner et al. | | |
| 2005/0216350 A1 * | 9/2005 | Aibazov et al. | | 705/19 |
| 2006/0071795 A1 * | 4/2006 | Benedikt | | 340/572.7 |
| 2006/0220866 A1 * | 10/2006 | Dixon et al. | | 340/572.1 |
| 2007/0141760 A1 * | 6/2007 | Ferguson et al. | | 438/127 |

FOREIGN PATENT DOCUMENTS

| | | |
|---|---|---|
| DE | 4425736 A1 * | 1/1996 |
| DE | 101 49 126 | 4/2003 |
| EP | 1 472 651 | 11/2004 |

* cited by examiner

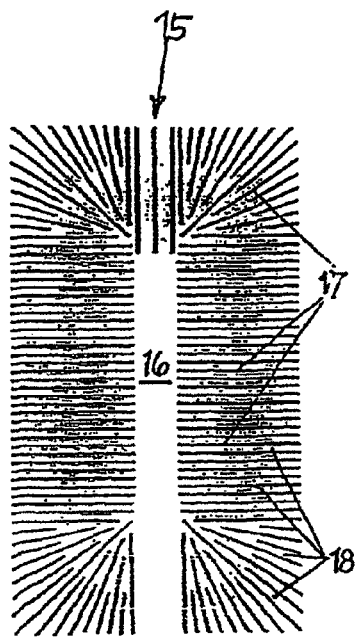
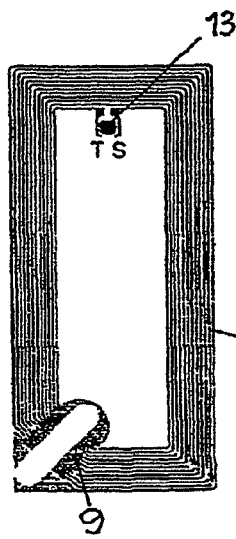
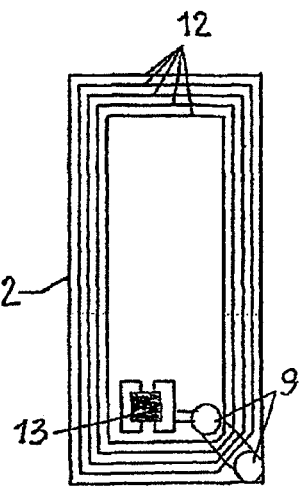
Fig. 7  Fig. 5  Fig. 6
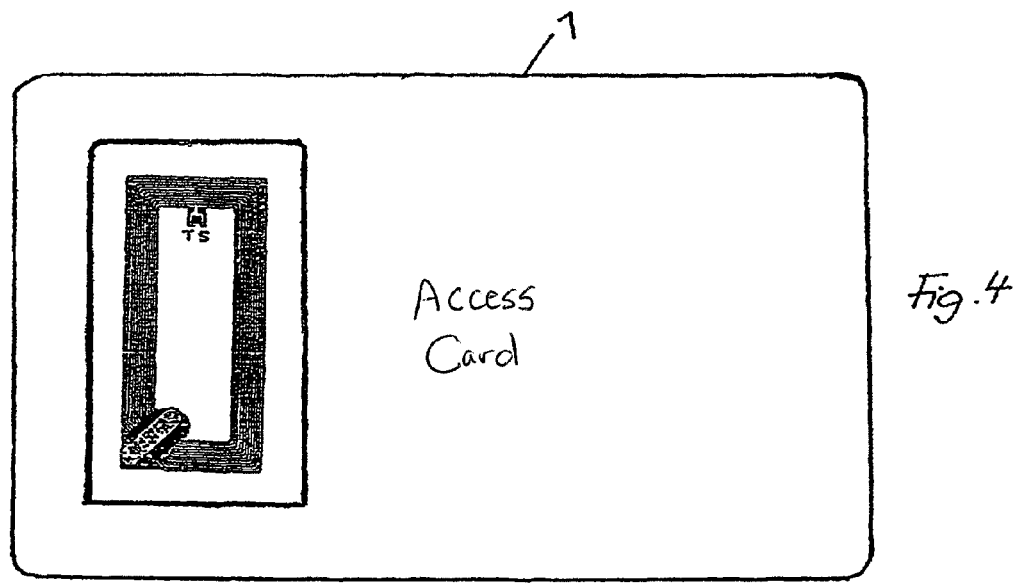
Fig. 4

ARRANGEMENT COMPRISING AN OBJECT MADE AT LEAST PARTIALLY OF METAL OR PRECIOUS METAL AND AN RFID IDENTIFICATION DEVICE

BACKGROUND OF THE INVENTION

The invention relates to an arrangement including an object made at least partially of metal and/or precious metal and an RFID identification device, which can be used in various technological areas for identifying and tracking objects and/or carriers.

As for the objects, it concerns the use in the security sector, the logistics sector, protection against theft, in the car sector, and generally everywhere where it involves the identification and tracking of objects, parts, subassemblies, containers and so forth. Examples of this are access cards, such as chip cards, credit cards, transponder cards, telephone cards, entry cards, but also any other, relatively high-value objects in the form of valuables and works of art, unique items and suchlike, as well as technical objects such as frame/racks, vehicles and aircraft as well as their parts, also spare parts, weapons of all kinds, defense equipments, containers, any industrial parts etc. Such objects are made for example of metal, precious metal, aluminium, cast aluminium, steel, sheet metal and similar conductive materials in any shape, quality and application, the identification device being disposed on or beneath the surface of the object, e.g. in the form of inlays.

Conventional access cards as a rule comprise a plate-shaped carrier in a rectangular shape and are produced from plastic. Amongst other things, they have the advantage of straightforward and cheap manufacture, low weight and absence of electrical conductivity, but on the other hand they have the drawback that they become electrostatically charged. Furthermore, there are access cards made of metal or with a metal plating, especially of precious metal, which have the advantages of exclusivity, a valuable appearance and prestige, status symbol etc. for the user, such access cards being used in the manner of conventional cheque cards.

Conventional RFID devices comprise a stationary or mobile reading device and an electronic microchip cooperating with an aerial. The aerial and the microchip form a transponder, which receives the radio waves as soon as it comes into the region of the induction field of the aerial. The aerial, for its part, is connected to the reading device and radiates radio waves. Transponders of this kind, as so-called "smart labels" comprising a self-adhesive film or as adhesive labels, can be applied, e.g. stuck, onto the most diverse objects. Such a transponder can also be inserted or fashioned as an inlay into cards, labels or any other objects. Such RFID inlays are protected by a sheathing of plastic in order to secure them against damage.

Contactless chip cards work with transponders, which have a microchip and an aerial arrangement, and are used as cheque cards, access control cards and suchlike. The identification data, which are read out by a reading device, are stored in a memory of the chip. Modern types of transponder draw energy from HF fields, store data and send the latter back by means of attenuation modulation.

The aerial structure of conventional transponders is configured as a conductor loop and enables an inductive signal coupling. Data can be exchanged over a distance of a few centimeters by means of an evaluation device. Since the energy required by the chip can be received contactless via the conductor loop, such a transponder does not require its own voltage source.

The use of transponders with HF conductor loops causes no problems for access cards made of plastic. In the case of access cards made of metal or corresponding electrically or magnetically conductive material, eddy currents are induced in the metal surface due to the magnetic alternating flux, as a result of which a magnetic field at the metal surface is attenuated so markedly that the data transmission of the chip of the transponder is impeded. The use of a transponder with a high-frequency conductor loop directly on a metallic surface is not readily possible, since eddy currents induced in the conductor loop attenuate the magnetic field in a decisive manner. This problem can be solved by the fact that highly permeable materials, such as ferrites, are disposed and orientated between the conductor loop and the metal surface in order for the most part to eliminate eddy currents.

The shielding of high-frequency fields presents a problem in technology, which in the case of the RFID technique is caused on account of the geometry of the aerial structure disposed in the immediate vicinity of the metallic substrate. For the purpose of shielding, use is made of ferrite films which are embedded in plastic and are insulated from one another electrically. For a trouble-free operation of an RFID system in connection with a metallic environment, films are provided in the region of the transponder, which are made of a highly permeable material and suppress eddy currents which are generated by the electrically conductive surface in the aerial structure when the transponder enters into a magnetic field of a corresponding reading device. A problem addressed by the invention is to specify an identification device in connection with different objects made of metal or precious metal or metal parts, said identification device comprising an RFID system with a transponder, whereby the location and routing of the object is to be monitored or protected.

SUMMARY OF THE INVENTION

According to the invention, an arrangement including an object made at least partially of conductive material such as metal or precious metal and an RFID identification device is proposed, wherein the RFID system is applied on a site of the object, on its surface, which is facing or can be caused to face an assigned reading device or is embedded into the object in the form of an inlay, and wherein means are provided which protect or attenuate the electrically conductive surface of the object against eddy currents induced in the conductor loop.

Furthermore, a method is proposed for the tracking and position-fixing of objects of all kinds, which are made at least partially of a metallic material or are plated therewith, and into which a position-fixing device operating according to RFID technology is integrated, which is distinguished by the fact that the object is produced from metal or precious metal or is plated therewith, and that a transponder and, spaced apart from the latter, an aerial coupled with a reading device are disposed in or on the object at an application-specific conductive site and the transponder is shielded with respect to the conductive surface.

BRIEF DESCRIPTION OF THE DRAWINGS

The invention is explained below with the aid of examples of embodiment in connection with the drawing. In the figures:

FIG. 4 shows a view of a practical embodiment of an access card according to that of FIG. 2, FIG. 5 shows an embodiment of a transponder with chip and aerial in a pictorial representation, FIG. 6 shows a modified embodiment of a transponder in a schematic representation, and another embodiment of an aerial for a transponder, and FIG. 7 shows an embodiment of a shielding device of a transponder for an access card made of precious metal.

DETAILED DESCRIPTION OF THE INVENTION

Figure 1:
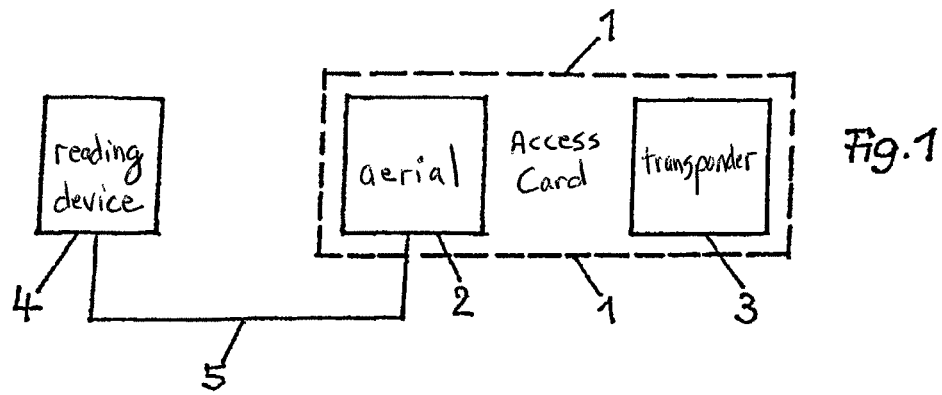
FIG. 1 shows a block diagram of an RFID system.

FIG. 1 represents schematically an RFID system in connection with an access card 1 made of precious metal. Access card 1 comprises a transponder 3, which picks up as a microchip, in combination with an aerial 2 which radiates radio waves. Transponder 3 does not have its own voltage supply and is active solely within the response region of the reading device. The energy required to operate the transponder is generated by reading device 4 and is transmitted via the connected aerial to the transponder.

Figure 2:
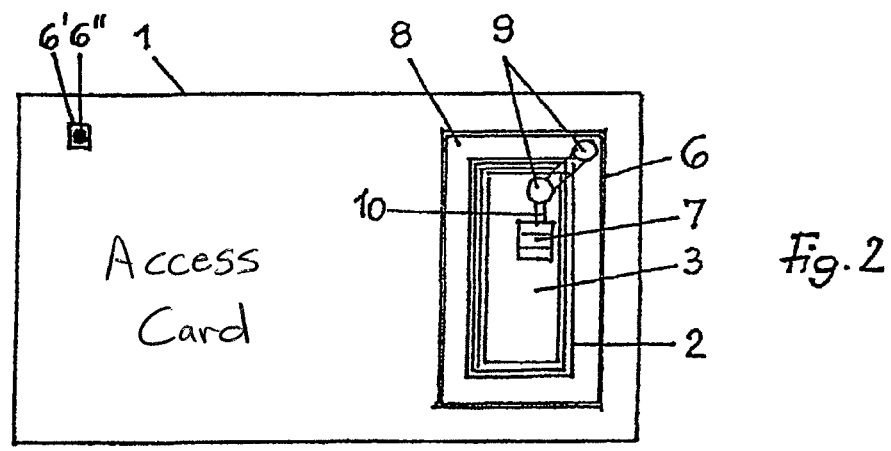
FIG. 2 shows a schematic representation of an access card with a transponder in plan view.
Figure 3:
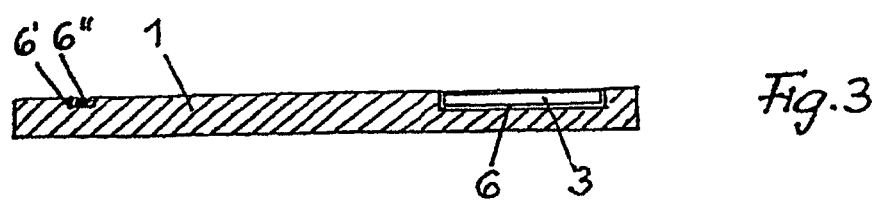
FIG. 3 shows the access card according to FIG. 2 with a transponder in cross-section according to line I-I.

FIGS. 2 and 3 show schematically access card 1, on whose surface there is formed, i.e. milled out, a recess 6 of small depth, into which aerial 2 and chip 7 of transponder 3 on a carrier 8 are inserted. This carrier 8 in the form of a transponder inlay comprises a thin paper layer or plastic film, onto which an electrically conductive metal film of aluminium or copper is deposited. The transponder-aerial is usually laminated as a full-area copper or aluminium film onto a plastic film and coated with light-sensitive photosensitive resist, and the regions corresponding to the aerial shape are etched away in an etching bath after exposure. A further small recess is indicated by 6', into which precious stone 6", e.g. a diamond, is embedded. The aerial connections or bridges are designated by 9 and the connections to chip 7 by 10.

The pictorial representation according to FIG. 4 shows access card 1 of precious metal in an enlarged pictorial representation. The representation in FIG. 5 shows aerial windings 12, aerial connections 9, chip 13 and terminal connections 10 between aerial 12 and chip 13. FIG. 6 is a schematic representation of the pictorial arrangement according to FIG. 5.

FIG. 7 shows a shielding device 15 for transponder 3, whose spatial extension is designed application-specific and which is formed on an electrically conductive surface 16, e.g. in the form of a plastic film or a substrate layer. The film or the substrate comprises a large number of fixed, highly permeable particles 17 in the region of the spatial extension of the aerial structure of the transponder. These ferromagnetic particles are orientated in such a way that, after being fixed-on film or substrate 16, they lie parallel to a magnetic field induced in the aerial structure of the transponder and suppress eddy currents, which occur when the transponder is introduced into the magnetic field of a corresponding reading device. Disposed between ferromagnetic particles 17 are free spaces 18, which act as air gaps. The film itself is made of highly permeable material.

In a further embodiment of the invention, a device is proposed wherein, for the purpose of shielding, ferromagnetic particles in the form of a shielding layer, e.g. a substrate applied on the object, are formed over a predetermined region and orientated magnetically, which region includes the aerial structure of the transponder, as a result of which the eddy currents generated when the transponder enters into the magnetic field of a reading device are reduced.

The subject matter of the invention, furthermore, is a tracking or position-fixing device with a transponder, which includes an electronic chip and an aerial structure, which is connected to an object made at least partially of metal and/or precious metal or is plated therewith, the transponder being formed on an application-specific, conductive surface of the object and the transponder being disposed insulated with respect to the conductive surface.

Finally, the application of RFID technology to objects, e.g. made of metal or precious metal, such as access cards, valuables, unique items, technical objects and so forth, is proposed according to the invention for the tracking or position-fixing of these objects, the RFID system being shielded with respect to the object which is made at least partially of metal or precious metal.

The invention is described below on the basis of an access card made of precious metal. However, the invention likewise relates to objects, unique items, apparatuses, vehicles or corresponding objects of other types that are to be protected and whose routing can be monitored or tracked.

The object, such as for example an access card, is preferably made completely or partially of precious metal, e.g. gold, silver, platinum, or of comparable, in particular precious metal, such as for example titanium, and comprises at least one accommodation site for a transponder at an arbitrary, application-specific, electronically readable site. This accommodation site is to be formed in such a way that the surface of the transponder is disposed roughly flush with the surface of the object, or that the transponder can be inserted, fashioned or embedded into a corresponding recess of the object. The transponder is designed for example as a self-adhesive film, which serves as a carrier for a microchip and an aerial, a sheathing or covering of plastic being able to be provided in order to protect the transponder against mechanical damage. The aerial is produced for example from a flat film of copper or aluminium, which is applied onto a plastic film, i.e. a double film, from which the windings are stamped, which can have a spiral shape, or a rectangular shape or suchlike. The film connected to the object, e.g. stuck onto it, as a carrier for the transponder, represents an insulating layer which forms the shielding with respect to the metallic material of the object in order that the emergence of eddy currents is suppressed.

In a further embodiment of the invention, in the case of an access card or suchlike, a precious stone, e.g. a diamond, is set into the surface at least one site of the upper side of the card, which precious stone terminates flush with the surface and which on the one hand demonstrates exclusivity of the card and on the other hand represents an orientation aid for the card user on account of the positioning at a selected site of the card.

The transponder unit picks up information wireless, processes it and feeds it back to the receiver. The corresponding information is fed wireless to inquiry stations which perform suitable controls. For the reception and transmission of such information, such arrangements require aerials or elements comprising coils, which are applied for example on a substrate by etching, vapour deposition, stamping or suchlike.

RFID systems permit the tracking of parts, subassemblies and objects generally in different technical areas, e.g. in vehicle and aircraft construction, but also for example in libraries in order to simplify the management of books and CDs.

Furthermore, in medicine and in chemistry for example, sample and analysis containers can be provided with "smart labels", such as for example in the form of self-adhesive films, adhesive labels, tags etc., in order that mix-ups can be avoided and prevented. Furthermore, exclusive and expensive items of clothing can be protected against imitations and against piracy when transponders are integrated into the items of clothing. This also applies to an abundance of other goods sectors which produce branded products at the high-price end. A particular case of application of RFID technology is represented by the entrance cards provided with transponder inlays in stadia which are equipped with barriers consisting of write/read devices.

What is claimed is:

1. An arrangement comprising an object made at least partially of metal or precious metal comprising an electrically-conductive metallic surface having a top surface side and an RFID transponder for receiving energy from a reading device comprising a chip and an aerial structure, the chip and aerial structure are connected to one another and are directly embedded onto a substrate layer of the RFID transponder, wherein the substrate layer of the RFID transponder is directly integrated into the top surface side of the electrically-conductive metallic of the object made at least partially of metal or precious metal thereby enabling the RFID transponder to receive the energy from the reading device, wherein the RFID transponder is directly placed into a recess on the top surface side of the electrically-conductive metallic surface of the object and is disposed flush with the top surface side of the electrically-conductive metallic surface of the object made at least partially of metal or precious metal, wherein the substrate layer comprises a plurality of fixed, highly permeable ferromagnetic particles in a region of a spatial extension of the aerial structure of the RFID transponder on a top surface facing the electrically-conductive metallic surface, where the plurality of fixed, highly permeable ferromagnetic particles are oriented in such a way, that after being fixed-on a top surface of the substrate layer, the plurality of fixed, highly permeable ferromagnetic particles lie parallel to a magnetic field induced in the aerial structure of the RFID transponder and thereby suppress eddy currents, which occur when the RFID transponder is introduced into the magnetic field induced by a the corresponding reading device and wherein disposed between the highly permeable ferromagnetic particles are free spaces, which act as air gaps and wherein the substrate layer is a highly permeable material and wherein the object is an access card, a chip card or a card made of precious metal with RFID technology.

2. The arrangement according to claim 1, wherein the object is a work of art or made of metal or precious metal with RFID technology.

3. An arrangement comprising an object made at least partially of metal or precious metal comprising an electrically-conductive metallic surface having a top surface side and an RFID transponder for receiving energy from a reading device comprising a chip and an aerial structure, the chip and aerial structure are connected to one another and are directly embedded onto a substrate layer of the RFID transponder, wherein the substrate layer of the RFID transponder is directly integrated into the top surface side of the electrically-conductive metallic of the object made at least partially of metal or precious metal thereby enabling the RFID transponder to receive the energy from the reading device, wherein the RFID transponder is directly placed into a recess on the top surface side of the electrically-conductive metallic surface of the object and is disposed flush with the top surface side of the electrically-conductive metallic surface of the object made at least partially of metal or precious metal, wherein the substrate layer comprises a plurality of fixed, highly permeable ferromagnetic particles in a region of a spatial extension of the aerial structure of the RFID transponder on a top surface facing the electrically-conductive metallic surface, where the plurality of fixed, highly permeable ferromagnetic particles are oriented in such a way, that after being fixed-on a top surface of the substrate layer, the plurality of fixed, highly permeable ferromagnetic particles lie parallel to a magnetic field induced in the aerial structure of the RFID transponder and thereby suppress eddy currents, which occur when the RFID transponder is introduced into the magnetic field induced by a the corresponding reading device and wherein disposed between the highly permeable ferromagnetic particles are free spaces, which act as air gaps and wherein the substrate layer is a highly permeable material, wherein the object made of precious metal is set with at least one diamond, which terminates flush with the surface and which represents a marking site of the object.

4. The arrangement according to claim 1, wherein the substrate layer comprises a reflector.

5. The arrangement according to claim 1, wherein the aerial structure is a conductor loop in the form of a UHF aerial, which is configured as a dipole, or an HF aerial, and which is configured as an induction loop.

6. An arrangement comprising an object made at least partially of metal or precious metal comprising an electrically-conductive metallic surface having a top surface side and an RFID transponder for receiving energy from a reading device comprising a chip and an aerial structure, the chip and aerial structure are connected to one another and are directly embedded onto a substrate layer of the RFID transponder, wherein the substrate layer of the RFID transponder is directly integrated into the top surface side of the electrically-conductive metallic of the object made at least partially of metal or precious metal thereby enabling the RFID transponder to receive the energy from the reading device, wherein the RFID transponder is directly placed into a recess on the top surface side of the electrically-conductive metallic surface of the object and is disposed flush with the top surface side of the electrically-conductive metallic surface of the object made at least partially of metal or precious metal, wherein the substrate layer comprises a plurality of fixed, highly permeable ferromagnetic particles in a region of a spatial extension of the aerial structure of the RFID transponder on a top surface facing the electrically-conductive metallic surface, where the plurality of fixed, highly permeable ferromagnetic particles are oriented in such a way, that after being fixed-on a top surface of the substrate layer, the plurality of fixed, highly permeable ferromagnetic particles lie parallel to a magnetic field induced in the aerial structure of the RFID transponder and thereby suppress eddy currents, which occur when the RFID transponder is introduced into the magnetic field induced by a the corresponding reading device and wherein disposed between the highly permeable ferromagnetic particles are free spaces, which act as air gaps and wherein the substrate layer is a highly permeable material, wherein the aerial structure is a conductor loop so that radiation emitted by the aerial structure is bundled.

7. The arrangement according to claim 3, wherein the substrate layer comprises a reflector.

8. The arrangement according to claim 3, wherein the aerial structure is a conductor loop in the form of a UHF aerial, which is configured as a dipole, or an HF aerial, and which is configured as an induction loop.

9. The arrangement according to claim 3, wherein the object is a work of art or made of metal or precious metal with RFID technology.

10. The arrangement according to claim 6, wherein the substrate layer comprises a reflector.

11. The arrangement according to claim 6, wherein the aerial structure is a conductor loop in the form of a UHF aerial, which is configured as a dipole, or an HF aerial, and which is configured as an induction loop.

12. The arrangement according to claim 6, wherein the object is a work of art or made of metal or precious metal with RFID technology.

\* \* \* \* \*